May 10, 1960 G. W. THOMPSON 2,936,073
FILTRATION OF TITANIA HYDRATE
Filed Oct. 31, 1957
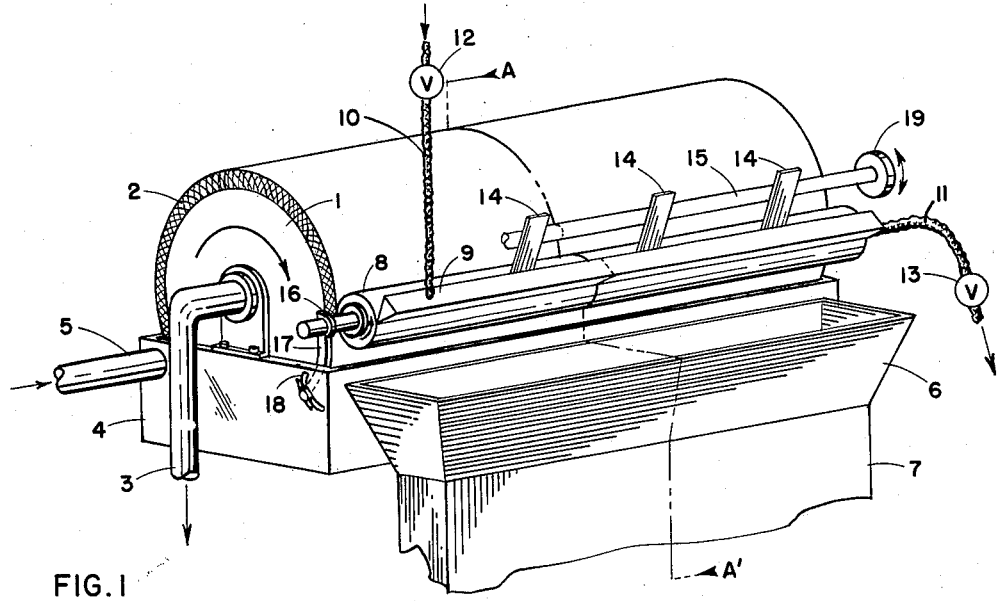
FIG. 1
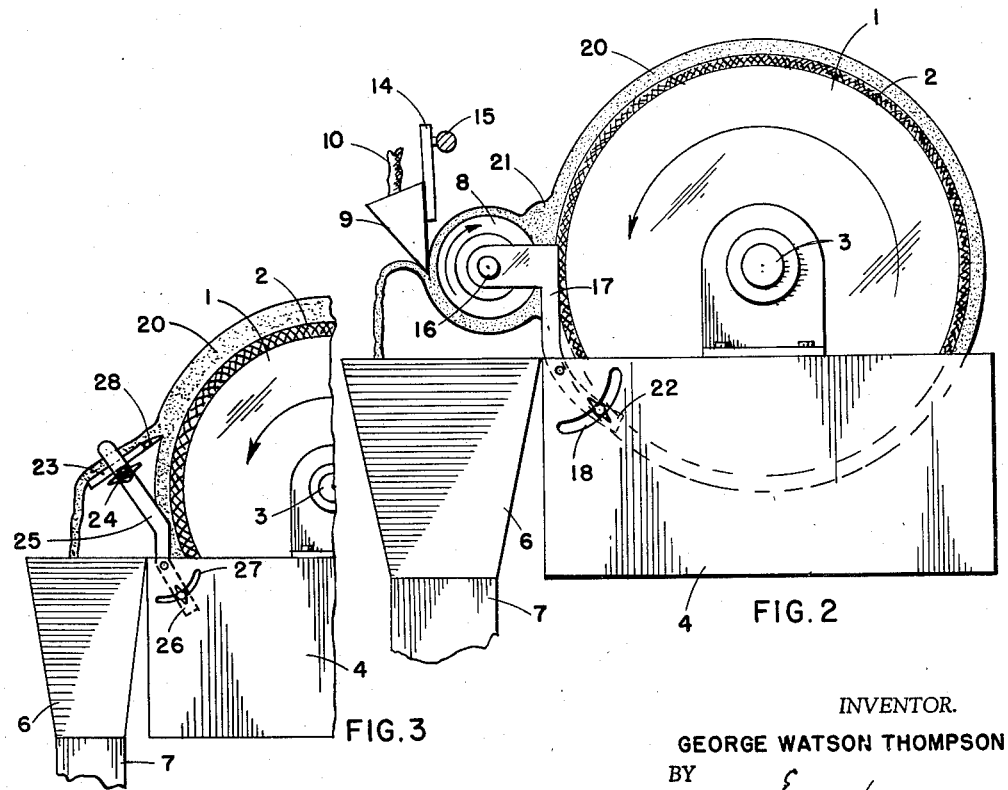
FIG. 2
FIG. 3
INVENTOR.
GEORGE WATSON THOMPSON
BY
ATTORNEY

2,936,073

FILTRATION OF TITANIA HYDRATE

George Watson Thompson, Amherst, Va., assignor to American Cyanamid Company, New York, N.Y., a corporation of Maine Application October 31, 1957, Serial No. 693,617

7 Claims. (Cl. 210—67)

The invention relates to a method of facilitating separation of adhesive, plastic titania hydrate from the take-off blades of continuous rotary vacuum filters. The invention includes the specific method of the invention for facilitating this separation, and further includes the method of dewatering an aqueous titania hydrate slurry of a continuous rotary vacuum filter wherein the method of the present invention is employed to facilitate separation of the hydrate from the take-off blade thereof.

Titania hydrate is generally manufactured by a process which comprises dissolving crude titanium sulfate in water, filtering off any solid impurities present, and heating the solution. The titanium sulfate content of the solution hydrolyzes to insoluble titania hydrate which precipitates, leaving the bulk of the impurities in dissolved form. The mother liquor is filtered off and the impurities adsorbed in or occluded by the hydrate are removed so far as practical by slurrying the hydrate in fresh water. The utility of the hydrate arises from the fact that it can be calcined to titanium dioxide pigment, the premium white pigment of commerce.

Before calcination the titania hydrate slurry is dewatered, and this dewatering is carried as far as possible by mechanical means so as to minimize the amount of water that must be evaporated during calcination. For this purpose, consequently, a rotary vacuum filter is employed. Such filters are principally composed of a drum or group of discs which slowly rotate through the titania hydrate slurry. A vacuum is supplied to the interior of the drum or discs. The vacuum draws the suspended titania hydrate onto the filter surface forming a cake from which as much free water as practical is sucked as the filter surface rotates through the air. A take-off knife or "doctor" blade is provided to remove titania hydrate cake from the filtering surface before the latter dips again into the trough. It is with this part of the procedure that the present invention is concerned.

Chemically, water-washed titania hydrate is a hydrous oxide gel. The aqueous phase of the cake is water containing up to a few percent of sulfuric acid, inorganic salts, and organic matter, and has a boiling point of about 100° C. or 110° C. The solid phase of the cake is composed of hard, abrasive pigment-like gel particles of purest white having a theoretical formula averaging about $10TiO_2.10H_2O.xSO_3$. The weight of the solid phase (calcined $TiO_2$ basis) is about 35%–40% of the weight of the cake. The introduction of even traces of color forming impurities into this material must be scrupulously avoided; cf. U.S. Patent No. 2,771,345. Titania hydrate cake, as removed from filters of the type described, is a sticky plastic material. It adheres to the fingers with about the same tenacity as putty of window glazing grade or masticated chewing gum. It is strongly self-adherent to steel, so much so that a layer 3" to 6" thick is capable of adhering to the underside of a horizontal steel plate against the parting effect of gravity, and is equally strongly cohesive. It thus has no tendency to fall from steel take-off blades but rather instead piles up thereon causing "blinding" of the cutting edge and tending to creep into the mechanism of the filter. Take-off blades made of organic plastic material such as polymerized tetrafluoroethylene have largely overcome the problem from the point of view of adhesiveness. The plastic, however, is soft and is rapidly abraded by the hydrate, requiring frequent adjustment of the machine and replacement of the blade. Moreover, the abraded plastic becomes an impurity in the hydrate.

It has now been found that separation of adhesive, plastic water-washed titania hydrate from a rotating surface of a continuous vacuum filter can be facilitated by positioning a heated take-off blade against the surface and parting titania hydrate therefrom with said blade, the temperature of said blade being in excess of 100° C. The surface to which the blade is applied may be the filtration surface of the filter or some other operating surface carrying titania hydrate such as a take-off roll.

It has been found that the adhesion of steel take-off blades for titania hydrate can be decreased to a negligibly low value by very moderate heating of the blades, adhesion being very slight in the range of 125° C.–150° C.

I have still further found the present invention decreases the wear to which the take-off blades are subject, and that at preferred temperatures in the range of 125° C.–175° C. the blade suffers negligibly from abrasion. Evidently a blanket of steam forms which decreases or prevents direct contact between the hydrate and the blade.

It is accordingly an object of the invention to find a means for facilitating separation of adhesive titania hydrate from abrasion-resistant take-off blades of rotary vacuum filters.

The invention possesses the following principal advantages:

(1) The take-off blade does not undergo substantial wear during use. The process thus does not introduce any significant amount of impurities into the hydrolysate.

(2) The blade does not require frequent adjustment as to temperature, angle, or position once optimum conditions have been arrived at. The invention thus does not require constant control.

(3) The invention does not require any change in the operation of the filter or in the composition of the slurry fed thereto. There is thus no need for operating personnel to learn any new procedure.

The optimum temperature of the blade in any one instance is a function of a number of independent variables as the peripheral speed of the drum, the temperature of the hydrate thereon, and whether the blade cleaves the hydrate as it rises or descends. In actual operations with drum filters having a take-off roll, adhesion of titania hydrate to the blade has been practically completely counteracted by maintaining the blade at a temperature of 125°–175° C. Higher temperatures are not generally needed but are without harm. The minimum effective temperature can be most simply found by trial, as shown in the example below. In general, the blade is maintained at an effective temperature in excess of 100° C. to facilitate separation of the hydrate from the blade.

The invention does not depend upon the particular way in which the blade is maintained at elevated temperature, and any convenient method may be employed. Thus it is within the scope of the invention to employ a solid metal blade directly heated by gas flames in contact therewith or to employ a blade indirectly heated by insulated electrical heating elements therein. It is further within the scope of the invention to employ a hollow blade heated by passage of hot combustion gas or liquid (including Dowtherm) therethrough. In practice I prefer to employ a hollow blade fabricated of non-corrosive metal and to employ steam as the heating fluid as steam delivers ample heat uniformly, cheaply, and in readily controllable manner. It is a principal advantage of the invention that the blade may be made of non-corrosive abrasion resistant material such as stainless steel. It is within the scope of the invention to use other inorganic material including glass, lead, ceramics and, where the amount of residual acid in the hydrate permits, aluminum.

The blade may be located at the same positions on the filtering surface and at the same angles as has been customary in rotary vacuum filters in the past. However, I have found that removal of the hydrolysate from the filtering surface is greatly facilitated by contacting the hydrolysate on a descending portion of the drum with an idler or "transfer" roll. I have found that such a roll can be used to strip a layer of hydrolysate from the surface of the filter, carry it away from the trough of the filter, and reverse its direction of rotation. I have found that the take-off knife can be positioned so as to part titania hydrolysate from a rising quadrant of such roll so that the force of gravity acts to separate the hydrate from the blade. As a result, the width of the blade may be less and its temperature lower than would otherwise be the case.

The invention will be more particularly described with reference to the drawings, wherein:

Figure 1 is a schematic perspective of a continuous vacuum drum filter in combination with a transfer roll and a hollow heatable take-off blade according to the present invention;

Figure 2 is an end view of the apparatus of Figure 1 showing the apparatus in normal operation, the blade and blade support being shown in section looking along line A—A' thereof in the direction of the arrows, and Figure 3 is an end view of apparatus corresponding to that of Figure 2 except that the transfer roll and blade of the apparatus of Figure 2 are replaced by a single broad hollow heatable blade.

In each figure 1 designates the filtration drum, 2 its wire and cloth filtering surface, 3 the vacuum line through which suction is applied to the drum and filtrate is removed therefrom, 4 the trough or bowl into which the filter drum is partially immersed, 5 the pipe for supply of titania hydrate slurry to trough 4, 6 the hopper into which the parted titania hydrate cake falls, and 7 the chute through which the cake falls to a screw conveyor or other discharge means (not shown).

In Figures 1 and 2, transfer roll 8 is provided to carry titania hydrate from the drum to a point above the hopper and to present a rising coating of titania hydrate for parting, take-off blade 9 which performs the parting is a hollow non-corrosive steel wedge provided with hot fluid supply and discharge lines 10 and 11 respectively containing pressure and flow regulating valves 12 and 13. Blade 9 is welded to steel hanger straps 14 which in turn are welded to rotatable control rod 15. Axle 16 of transfer roll 8 is journalled into bracket 17 made adjustable by clamping nut passing through curved slot 22.

In Figure 2 filtering surface 2 is shown as carrying a normally thick coating of titania hydrate 20. The figure shows a part of this coating being stripped off by transfer roll 8 and a part of the transferred coating being parted by hot blade 9, the parted titania hydrate falling without significant adhesion into hopper 6. A small amount of hydrolysate accumulates at 21 in the nip of the rolls.

In Figure 3 the transfer roll and wedge-shaped blade of Figure 2 are replaced by hollow steel blade 23.

The blade is welded to and supported by rotatable rod 24 journalled into pivoted bracket 25 the lower arm of which 26 can be clamped through arced slot 27. The forward end of blade 23 is provided at an upper part with inlet orifice 28 for the heating fluid. The exhaust fluid leaves through the orifice at its other end as shown in Figure 1. The hot fluid supply and discharge lines of the blade correspond to lines 10 and 13 of Figure 1 and are therefore not shown.

The apparatus of Figures 1 and 2 may be placed in operation as follows:

Filtration bowl 4 is filled with titania hydrate slurry through pipe 5, drum 1 is rotated at a convenient rate, for example 1 r.p.m., and sufficient vacuum is supplied to suction line 3 to maintain a coating of titania hydrate on filtration surface 2 between about 1" and 2" thick. Bracket 17 is then adjusted so that transfer roll 8 presses sufficiently firmly against the titania hydrate 20 on surface 2 so as to pick up a layer of titania hydrate about ½"–1" thick. Because of the counter-rotation of cylinders 1 and 8, a small amount of titania hydrate tends to accumulate at the nip of the rolls, at 21. The temperature of the blade is then raised to about 150° C. by admission of steam through line 10, valves 12 and 13 being adjusted as necessary. The blade is then advanced by rotation of wheel 19 into position so as to slice about the outer ½" of hydrate from the transfer roll. The temperature is then adjusted so that the hydrate falls from the blade after about 1" of apparent contact therewith, experience having shown that this is harmless from the adhesion and abrasion points of view while minimizing consumption of steam.

The apparatus of Figure 3 may be prepared for operation in similar manner. After titania hydrate cake has built up on filtration surface 2 as described, blade 25 is heated with steam to about 250° F. and brought into position substantially as shown in the drawing, a suitable elevation of the blade being about 60° from the horizontal and the position of the blade being such that the layer of hydrate removed is about ½"–1" of hydrate thick. The temperature of the blade is regulated so that the hydrate slips smoothly over a blanket of steam.

*Example*

The following illustrates the application of the present invention to the commercial dewatering of titania hydrolysate slurries. For the illustration there was used a continuous rotary vacuum drum filter of the Oliver type having a cloth-covered wire-wound drum 5'6" in diameter and 4' long, and a rubber-covered transfer roll 7" in diameter. The roll was spaced about 1.5" from the drum and positioned as shown in Figure 2 of the drawing.

The doctor blade was a hollow wedge 3" x 3" x 3" x 48" made from sheets of No. 316 stainless steel welded together, and was mounted pointing downwardly at an angle of 45° tangentially against the lower rising quadrant of the take-off roll, as shown in Figure 2.

The drum was set to rotate at one revolution per minute. The bowl of the filter was supplied with aqueous slurry of washed titania hydrate. The specific gravity of the slurry was 1.32 and its temperature 29° C. The boiling point of the aqueous phase of the slurry was 101°–105° C.; from experience it is known that the boiling point of this phase and of the free water in the drum cake are substantially the same.

Steam at 75 lb./in.$^2$ pressure gauge was supplied to the doctor blade and a vacuum of 24" of water was applied to the interior of the drum of the filter. A cake of titania hydrate about 1" thick continuously accumulated on the drum in the trough and was sucked down to a solids content of 38.5% (calcined $TiO_2$ basis) by the time it had rotated to the take-off roll. The thickness of the coating on the transfer roll was about 0.75" and the doctor blade was positioned so as to "peel" off a layer about 3/16" thick from the hydrolysate or the drum.

The pressure of the steam was then gradually decreased and the tendency of the titania hydrate to adhere noted. Least consumption of steam coupled with most satisfactory decrease in adhesiveness of the blade occurred with a steam pressure of 50 lb./in.$^2$, equivalent to a temperature of 150° C. At this pressure the blade operated noiselessly and the amount of steam evolved from the hydrate was difficult to see.

In operation with this pressure of steam the cake was smoothly cleaved by the blade from the transfer roll and dropped cleanly into the discharge hopper. Separation of the cake from the blade was complete about 1" from the leading edge of the blade. No binding of the blade edge occurred, the hydrate flowing smoothly over the leading edge of the blade and dropping therefrom immediately thereafter.

When the steam supply to the blade was cut off, discharge of titania hydrate from the blade ceased. A thick layer of hydrate spread over all three sides of the blade and started to climb up the straps from which the blade was suspended.

The blade was inspected after three months of continuous operation. No abrasion of the blade was observed, indicating that there is little or no contact between the hydrate and the blade.

I claim:

1. A method of separating adhesive, plastic, water-washed titania hydrate from a rotating surface of a continuously rotating vacuum filter, which comprises positioning a heated take-off blade against said surface and parting hydrate therefrom with said blade, the temperature of said blade being in excess of 100° C., so that, a blanket of steam is formed between the hydrate and the blade.

2. A process according to claim 1 wherein the blade is a stainless steel blade and the temperature thereof is in excess of 125° C.

3. A method of separating adhesive, plastic, water-washed titania hydrate from the filtering surface of a vacuum drum filter, which comprises positioning an idler roll against a descending portion of the periphery of said filter surface thereby transferring titania hydrate from said surface to said roll, positioning a heated take-off blade against a rising portion of said idler roll whereby titania hydrate is parted from said roll, and maintaining said blade at a sufficient temperature in excess of 100° C. to substantially prevent adhesion of said hydrate thereto by the formation of a blanket of steam between the hydrate and the blade.

4. In the separation of adhesive, plastic, water-washed titania hydrate from the filtering surface of a continuously rotating vacuum filter wherein titania hydrate is parted from said surface by a take-off blade, the improvement which comprises maintaining said blade at an effective temperature in excess of 100° C. to substantially prevent adhesion of said hydrate thereto by the formation of a blanket of steam between the hydrate and the blade.

5. In the continuous dewatering of an aqueous titania hydrate slurry wherein titania hydrate is sucked upon a continuous rotating vacuum filter forming an adhesive, plastic cake thereon and said cake is continuously cleaved by the action of a take-off blade, the method of facilitating separation of said hydrate from said blade which consists in maintaining said blade at a temperature in excess of 100° C., so that, a blanket of steam is formed between the hydrate and the blade.

6. A method according to claim 1 wherein the blade is maintained at a temperature between about 125° C. and 175° C.

7. A method for continuously dewatering an aqueous titania hydrate slurry which comprises sucking titania hydrate upon a continuous rotating vacuum drum filter forming an adhesive, plastic cake thereon, transferring at least part of said cake to a counter-rotating take-off roll positioned against a descending quadrant of said drum, and continuously cleaving cake from said take-off roll by the action of a blade positioned against a rising quadrant of said roll, said blade having a temperature in excess of 100° C., so that, a blanket of steam is formed between the hydrate and the blade.

References Cited in the file of this patent

UNITED STATES PATENTS

| 1,353,980 | Yahn | Sept. 28, 1920 |
| 1,809,718 | McNeil | June 9, 1931 |
| 1,914,742 | Hillier | June 20, 1933 |
| 2,070,074 | Young | Feb. 9, 1937 |
| 2,273,021 | Cox | Feb. 17, 1942 |
| 2,294,179 | Hawley | Aug. 25, 1942 |
| 2,395,098 | Butler | Feb. 19, 1946 |
| 2,652,929 | Aagaard | Sept. 22, 1953 |

OTHER REFERENCES

Ser. No. 136,429, Netzel (A.P.C.), published May 25, 1943.